United States Patent Office 3,507,003
Patented Apr. 21, 1970

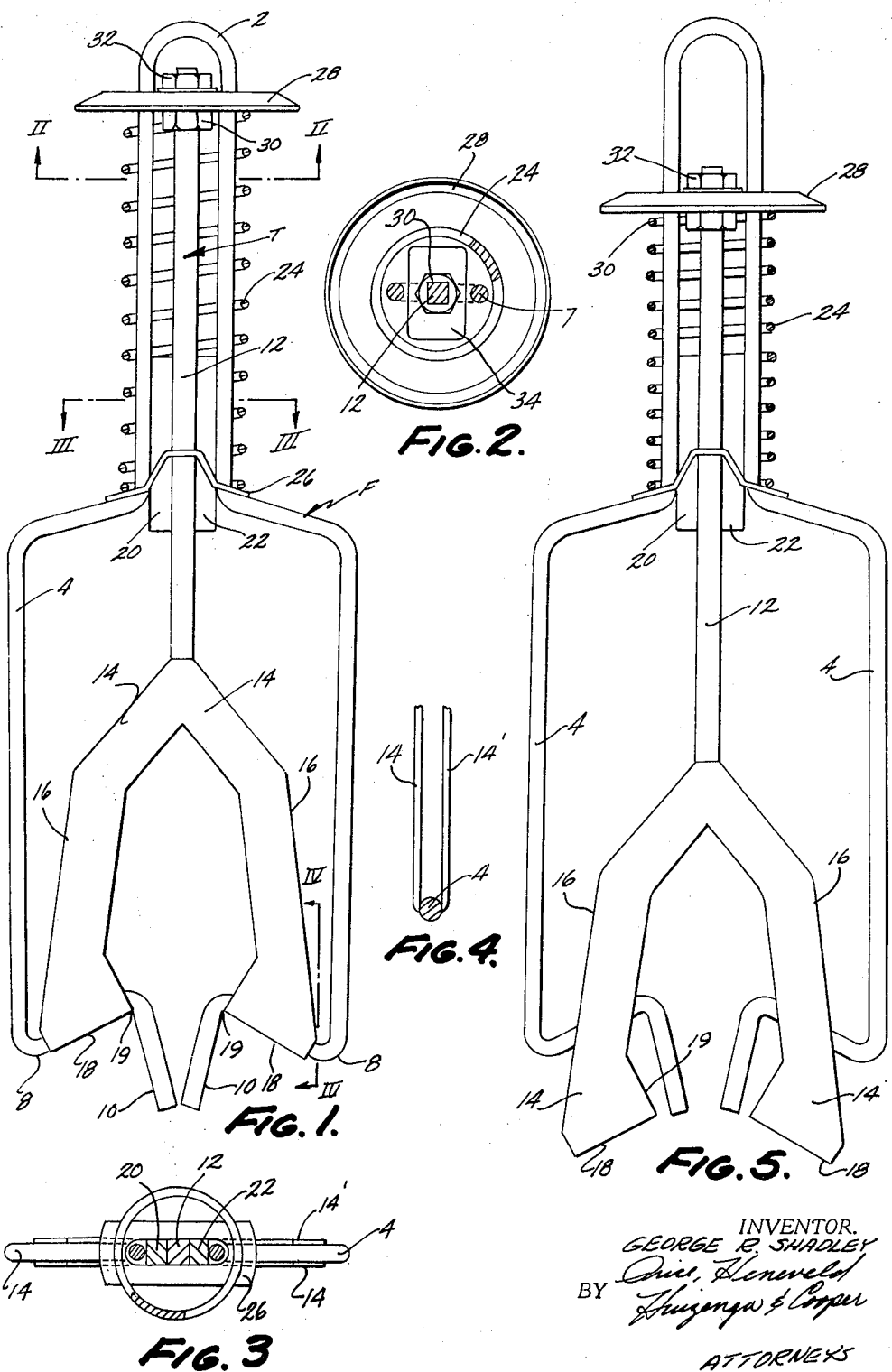

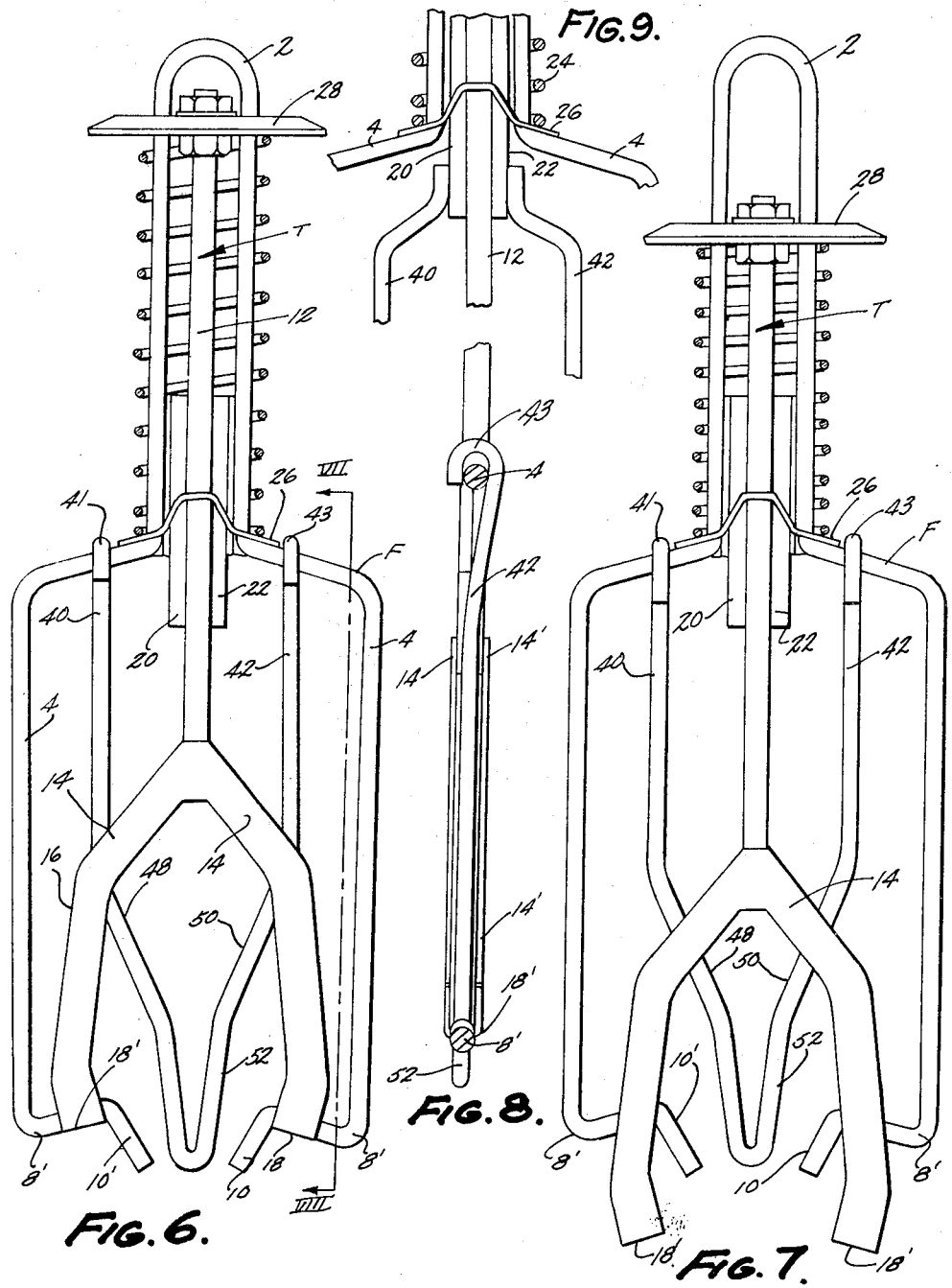

3,507,003
POULTRY SHACKLE
George R. Shadley, Ottumwa, Iowa, assignor to International Agri Systems, Inc., Ottumwa, Iowa, a corporation of Iowa
Filed Oct. 9, 1967, Ser. No. 673,888
Int. Cl. A22c 15/00, 21/100
U.S. Cl. 17—44.1                          11 Claims

ABSTRACT OF THE DISCLOSURE

This disclosure relates to a poultry shackle having a frame adapted to be carried by a shackle conveyor and a traveler carried by the frame, moveable vertically therewith. The frame and traveler have cooperating leg engaging elements which define receiving slots for the legs of an animal. The leg engaging elements of the frame are moveable away from the traveler and are biased toward the leg engaging elements of the traveler. The frame has cam surfaces formed on the ends of the leg engaging elements which cooperate with the traveler and are supported solely by the leg engaging elements.

In one embodiment a neck engaging loop is attached to one end of the frame and has a lower slot which is positioned between the traveler leg engaging elements.

---

In copending Ser. No. 524,326, filed Feb. 1, 1966, now U.S. Patent 3,376,600, there is disclosed and claimed a mechanical discharge shackle for fowls and the like in which a frame and traveler are employed to engage the legs of the fowl. Central cam bars are attached at the bottom and top portions of the frame.

I have now discovered a poultry discharge shackle in which the leg engaging portions of the frame are highly resilient, yet are biased in the closed position. The improved shackle can also have a neck engaging loop positioned between the leg engaging portions of the frame and traveler.

By various aspects of this invention one or more of the following, or other, objects can be obtained.

It is an object of this invention to provide an improved poultry shackle which is easily constructed and quickly assembled.

It is a further object of this invention to provide an improved poultry eviscerating shackle wherein the leg engaging elements are freely releasable as required.

It is yet another object of this invention to provide an improved poultry shackle having resiliently biased leg engaging elements and a neck engaging member between the leg engaging elements whereby the shackle is easily loaded and unloaded when desired.

It is a further object of this invention to provide a poultry discharge shackle which has leg engaging portions and which can be easily converted to a shackle containing a neck engaging loop.

Other aspects, objects and the several advantages of this invention are apparent to one skilled in the art from the study of this disclosure, the drawings and the appended claims.

According to the invention, there is provided a poultry shackle having a frame adapted to be carried by a shackle conveyor, and a traveler carried by the frame and moveable vertically therewith. The frame and traveler have cooperating leg engaging elements which define receiving slots for the legs of an animal, the leg engaging elements of the frame being moveable away from the traveler and being biased toward the leg engaging elements of the traveler. According to the invention, the frame has cam surfaces at the ends of the leg engaging elements which are quite flexible in the absence of being biased by the traveler. The cam surfaces are an integral part of the frame.

The shackle also preferably has a neck engaging loop which is positioned between the leg engaging elements of the traveler.

The invention will now be described with reference to the accompanying drawings in which:

FIG. 1 is a front elevation of a mechanical discharge shackle embodying my present invention, the parts thereof being in normal position;

FIG. 2 is a sectional view taken along line II—II of FIG. 1;

FIG. 3 is a sectional view of the shackle shown in FIG. 1 taken along lines III—III thereof;

FIG. 4 is a sectional view of the shackle shown in FIG. 1 taken along lines IV—IV thereof;

FIG. 5 is a view similar to FIG. 1 showing the shackle during the mechanical discharge operation;

FIG. 6 is a front elevational view of a second embodiment of the invention;

FIG. 7 is a front elevational view of the embodiment shown in FIG. 6 in the discharging position;

FIG. 8 is a sectional view taken along lines VIII—VIII of the FIG. 6; and

FIG. 9 is a partial front elevational view of a modified form of the second embodiment of the invention.

Referring now to the drawings, and in particular FIGS. 1 through 5, a discharge shackle is shown having a frame generally indicated by the letter F and a traveler indicated by the letter T. The frame comprises an upper inverted U-shaped portion 2 having leg engaging elements 4. The frame leg engaging elements 4 extend outwardly and downwardly and extend inwardly at 8 and then downwardly and inwardly forming cam members 10. The traveler has a central shaft 12, and spaced leg engaging elements 14 and 14'. The leg engaging elements of the traveler form a double wall as can be best seen in FIG. 4. The traveler has leg engaging surfaces 16 which cooperate with leg engaging elements 4 of the frame. The double wall traveler leg engaging elements 4 and 4' are joined at 18 beneath the inwardly extending positions of the frame members 4.

The traveler is slidable vertically relative to the frame between bars 20 and 22 which are attached to the bottom portion of inverted U-shaped member 2.

The traveler T is biased upwardly relative to the frame through spring 24 which is positioned around the inverted U-shaped member 2. A flange 26 and a ring 28 contain the spring 24 on the inverted U-shaped member 2. Ring 28 is attached to shaft 12 of the traveler through nuts 30 and 32. A spring centering plate 34 is provided between bolt 30 and ring 28 (see FIG. 2).

In the normal position, as shown in FIG. 1, the bottom portion 18 of traveler T will be positioned against the inwardly extending portion of leg engaging elements 4. Surface 19 of traveler T bears against the uppermost portion of cam surfaces 10. When a fowl's shanks are inserted between elements 4 and surfaces 16, the traveler is forced downwardly with respect to the frame. At this time, leg engaging elements 4 move outwardly with the cam portions 10 bearing against surfaces 19, thereby forcing traveler T downwardly. When the legs are between surfaces 16 and elements 4, the weight of the animal will pull the legs down to the lowermost portion of the animal leg receiving slots. This pressure forces leg engaging elements 4 outwardly with the cam portions thereof bearing against surfaces 19 of traveler T. This pressure of cam surfaces 10 against surfaces 19 forces the traveler downwardly against the pressure of spring 24. In this manner, the legs of an animal will be held in place due to the spring pressure between the frame and the traveler.

When it is desirable to discharge the animal from the shackle, ring 28 contacts a stationary cam surface as it moves along the track. The shackle is carried by a hook which is inserted under the uppermost portion of inverted U-shaped member 2. As the stationary cam contacts the ring 28, and forces the same downwardly, the traveler will move downwardly thereby opening the leg receiving slots between the frame and the traveler. In this manner, the animal will be readily discharged from the shackle.

In the embodiment shown in FIGS. 6, 7, and 8, the shackle is substantially the same except that the inwardly extending portion of the leg engaging elements is somewhat shorter, and the downwardly and inwardly directed cam members 10' are spaced from each other. Additionally, the traveler leg engaging portions have a narrower connection at 18' to correspond with the shorter inwardly extending portion of the frame. In this embodiment, a neck engaging loop for the animal is provided. The neck engaging loop comprises downwardly extending members 40 and 42 which are attached to the bottom of inverted U-shaped portion 2 through hooks 41 and 43. The loop extends inwardly at 48 and 50 and is joined by a lower V-shaped member 52. The neck of the fowls will be wedged into V-shaped member 52. As can be seen from FIG. 8, the neck engaging loop is positioned between the spaced members 14 and 14' of the traveler. The neck engaging loop is advantageous in some eviscerating operations in that the fowl is held in a horizontal position.

The operation of this embodiment of the invention is similar to that of the first embodiment. When the stationary cam acts against ring 28, the traveler is forced downwardly thereby widening the leg receiving slots allowing the animal's legs to fall from the shackle.

The operation of the biasing means and the leg engaging slots is also similar for that operation described with reference to the first embodiment. In particular, the cam surfaces 10' abut against portions 18' of the traveler.

The traveler is biased in the upward position relative to the frame. Thus, when outward pressure is directed against the leg engaging elements 4 of the frame, the pressure of cam portions 10' force the traveler downwardly against the spring pressure.

In the construction of the shackle described, the frame is advantageously formed from a wire rod by simply bending the same into the described configuration. The neck engaging loop can be formed in the same manner.

The hooks on the neck engaging loops are easily and quickly attached to the frame, thereby providing a simple function construction which utilizes a minimum of labor.

Whereas the second embodiment has been described with reference to a neck engaging loop which has frame engaging hooks, it is within the scope of the invention to bend the upper portions of the neck engaging loop inwardly and attach the same to bars 20 and 22 as illustrated in FIG. 9. Similarly the upper portion of the neck engaging loop could simply replace bars 20 and 22 and be welded to the frame in the same manner as are bars 20 and 22.

Reasonable variation and modification are possible within the scope of the foregoing disclosure and drawings of the invention without departing from the spirit thereof.

I claim:

1. In a poultry shackle having a frame adapted to be carried by a shackle conveyor, a traveler carried by said frame and moveable vertically therewith, said frame and traveler having cooperating leg engaging elements defining receiving slots for the legs of an animal, wherein the leg engaging elements of said frame are moveable away from said traveler and are biased toward said leg engaging elements of said traveler, the improvement which comprises said frame having cam surfaces integrally formed on the ends of said leg engaging elements which cam surfaces are supported solely by said frame leg engaging elements.

2. A poultry shackle according to claim 1 wherein there is further provided a neck engaging loop attached at one end to said frame and having a lower slot, said loop being positioned between said traveler leg engaging elements.

3. A discharge shackle according to claim 1 wherein said frame comprises an upper inverted U-shaped portion, two of said leg engaging elements depend therefrom, each leg engaging element of said frame is characterized by an outwardly and downwardly extending portion, an inwardly extending portion and a downwardly and inwardly extending cam surface portion.

4. A poultry shackle according to claim 3 wherein said traveler comprises an upper rod positioned within said inverted U-shaped portion of said frame, and reciprocatable with respect thereto, said traveler leg engaging elements are attached to the bottom portion of said rod and have sloping surfaces to cooperate with said frame leg engaging elements, cam actuating means on the bottom of said traveler leg engaging elements extending beneath said inwardly extending member and contacting said frame cam member such that upward force applied by said traveler cam actuating means will bias said frame leg engaging elements inwardly.

5. A poultry shackle according to claim 4 wherein there is provided means to bias said traveler upwardly with respect to said frame.

6. A poultry shackle according to claim 4 wherein there is provided a neck engaging loop, said neck engaging loop being attached to an upper portion of said frame.

7. A poultry shackle according to claim 6 wherein said neck engaging loop has a V-shaped portion positioned between said leg engaging portion of said traveler.

8. A poultry shackle according to claim 1 wherein each traveler leg engaging element comprises a pair of spaced members, and there is provided a neck engaging loop attached to said frame and positioned between said spaced members.

9. A poultry shackle according to claim 8 wherein said neck engaging loop is attached to said frame at an upper portion thereof, and said traveler has a rod attached to said traveler leg engaging elements, said rod being reciprocatable between portions of said neck engaging loop.

10. A poultry shackle according to claim 2 wherein upper portions of said neck engaging loop contains hooks which engage upper portions of said frame.

11. A poultry shackle according to claim 1 wherein said frame is integrally formed from a length of wire rod.

References Cited

UNITED STATES PATENTS

| | | | |
|---|---|---|---|
| 2,797,436 | 7/1957 | Shadley | 17—44.1 |
| 3,023,453 | 3/1962 | Jensen | 17—44.1 |
| 3,156,007 | 11/1964 | Smith | 17—44.1 |
| 3,247,543 | 4/1966 | Bonuchi | 17—44.1 |
| 3,376,600 | 4/1968 | Shadley | 17—44.1 |

LUCIE H. LAUDENSLAGER, Primary Examiner